United States Patent
Bagshaw et al.

(10) Patent No.: US 9,830,898 B2
(45) Date of Patent: Nov. 28, 2017

(54) MOUNTING ARRANGEMENTS

(71) Applicant: BAE SYSTEMS plc, London (GB)

(72) Inventors: John Martin Bagshaw, Chelmsford (GB); Nicholas John Archer, Chelmsford (GB); Lionel William John Kent, Chelmsford (GB); Duncan Peter Rowe, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/262,627

(22) Filed: Sep. 12, 2016

(65) Prior Publication Data
US 2016/0379612 A1    Dec. 29, 2016

Related U.S. Application Data

(63) Continuation of application No. 13/981,784, filed as application No. PCT/GB2012/050142 on Jan. 24, 2012, now Pat. No. 9,457,546.

(30) Foreign Application Priority Data

Jan. 31, 2011  (EP) .................................. 11275019
Jan. 31, 2011  (GB) ................................. 1101554.2

(51) Int. Cl.
*G10K 11/00*     (2006.01)
*B32B 37/12*     (2006.01)
(Continued)

(52) U.S. Cl.
CPC ............ *G10K 11/004* (2013.01); *B32B 37/12* (2013.01); *G10K 11/02* (2013.01); *H04B 13/00* (2013.01);
(Continued)

(58) Field of Classification Search
CPC ............... Y10T 403/27; G01P 15/0907; G01P 15/0915; G01P 15/0922; G01L 19/142;
(Continued)

(56) References Cited

U.S. PATENT DOCUMENTS 3,120,622 A    2/1964  Dranetz et al.
3,441,754 A    4/1969  Heny
(Continued)

FOREIGN PATENT DOCUMENTS

DE    3107878 A1    9/1982
EP    2 293 469 A1   3/2011
(Continued)

OTHER PUBLICATIONS

International Search Report dated Jul. 5, 2012 issued in PCT/GB2012/050142.
(Continued)

*Primary Examiner* — Jonathan Masinick
(74) *Attorney, Agent, or Firm* — Scully, Scott, Murphy & Presser, PC

(57) ABSTRACT

In an arrangement for transmitting power or data through a solid rigid substrate without penetrating the substrate, acoustic transducer components are mounted on the substrate by means of strain isolator elements which are welded or otherwise bonded to the substrate and providing an attachment surface to which the attachment interface of the acoustic transducer may be attached. The strain isolator element is of the same or similar acoustic impedance as the rigid substrate and may indeed be formed of the same material. Various geometries of strain isolator are disclosed, including a plain spacer block, and one comprising a stalk attached to the solid rigid substrate and topped by a disc in a 'mushroom' configuration.

13 Claims, 3 Drawing Sheets

(51) Int. Cl.
*G10K 11/02* (2006.01)
*H04B 13/00* (2006.01)

(52) U.S. Cl.
CPC ......... *B32B 2457/00* (2013.01); *Y10T 156/10* (2015.01); *Y10T 403/477* (2015.01)

(58) Field of Classification Search
CPC .. G01L 19/145; G10K 11/004; G10K 11/006; G10K 11/008
See application file for complete search history.

(56) References Cited

U.S. PATENT DOCUMENTS

| | | | |
|---|---|---|---|
| 4,484,962 | A | 11/1984 | Dienes et al. |
| 4,800,758 | A | 1/1989 | Knecht et al. |
| 5,315,203 | A | 5/1994 | Bicos |
| 5,408,878 | A | 4/1995 | Lysen |
| 5,869,762 | A | 2/1999 | Corsaro et al. |
| 6,625,084 | B1 | 9/2003 | Payton |

FOREIGN PATENT DOCUMENTS

| | | |
|---|---|---|
| GB | 1 369 363 | 10/1974 |
| JP | 47-27488 | 10/1972 |
| JP | 62-13080 | 4/1977 |
| JP | 07-297560 | 10/1995 |
| JP | 2001-156413 | 8/2001 |
| JP | 2009-302707 | 12/2009 |
| WO | 2008/075092 A1 | 6/2008 |
| WO | 2009013235 A1 | 1/2009 |
| WO | 2011/027168 A1 | 3/2011 |
| WO | 2011/027169 A1 | 3/2011 |

OTHER PUBLICATIONS

Extended European Search Report dated Jul. 26, 2011 issued in EP 11275019.5.
UK Search Report dated Jun. 2, 2011 issued in GB1101554.2.
International Preliminary Report on Patentability together with the Written Opinion of the International Searching Authority from related International Application No. PCT/GB2012/050142, dated Aug. 15, 2013.
Office Action dated Jan. 6, 2015 received from the Japanese Patent Office in related application 2013-550948 together with English language translation.
Office Action dated Jul. 20, 2015 in related U.S. Appl. No. 13/981,984.
Final Office Action dated Jan. 8, 2016 in related U.S. Appl. No. 13/981,984.
Notice of Allowance dated Apr. 4, 2016 in related U.S. Appl. No. 13/981,984.

MOUNTING ARRANGEMENTS

CROSS REFERENCE TO RELATED APPLICATIONS

The present application is a continuation application of U.S. Ser. No. 13/981,784, which is a national phase filing of PCT/GB2012/050142 filed on Jan. 24, 2012, which claimed priority from GB 1101554.2 filed on Jan. 31, 2011 and EP 11275019.5 filed on Jan. 31, 2011, the entire contents of each of which are incorporated herein by reference.

BACKGROUND OF THE INVENTION

This invention relates to mounting arrangements and methods for mounting an element on a rigid substrate which in use is subject to high strain.

In particular, but not exclusively, this invention is concerned with mounting an acoustic transducer component on a barrier to achieve Non Penetrating Data Transfer (NPDT) across a barrier which in use is subject to high strain. In this specification, the term 'high strain' is used to mean strains in excess of $0.5 \times 10^{-3}$. The invention however also is applicable in other situations where an element (such as a sensor) is mounted on a substrate subject to high strain and needs to be protected against the high strain either to prevent damage to the element itself or to a fixing interface such as an adhesive layer, between the element and the substrate. Such elements include sensors such as, for example, thermocouples.

NPDT is a technology that permits the transmission of data and power through solid barriers using ultrasonic acoustic waves. NPDT can reduce or eliminate the traditional penetrations required for wired connections through protective barriers. This is highly attractive when the structural integrity of the barrier, or its hermetic integrity, is of paramount importance; for example in submarines, the nuclear industry and the chemical industry. Reducing the total number of penetrations through such barriers may enhance safety whilst reducing installation costs, and through-life costs. This technology can also enable the retrofitting of new sensor capabilities to existing platforms to meet emerging requirements without compromising the barrier's performance. For examples of such methods reference is directed to our earlier patent publication EP2122868, and co-pending applications PCT/GB2010/051469 and PCT/GB2010/051470, the contents of which are incorporated here and by reference.

In particular applications data is transmitted though a solid barrier using high frequency acoustic signals typically, but not exclusively, in the frequency range ~3 MHz to ~55 MHz. Piezo-electric transducers bonded onto opposite surfaces of a solid barrier by a very thin adhesive layer launch or receive these ultrasonic signals. The ultrasonic beam launched by each transducer is highly directional and will remain collimated over typical barrier thicknesses likely to be encountered in the real world. Digital data transmission rates of >150 MB/s are viable through a single acoustic channel link, and separately power transfer of up to ~100 watts has been successfully demonstrated. Although we have used adhesives in our current work (as referenced above) to bond the transducer to the substrate or to the carrier plate, other materials could be used subject to not cracking the transducers due to thermal shock during the bonding process by using, for example a low temperature solder, or other bonding materials.

In existing designs, the Piezo-electric transducers of the NPDT links need to be bonded either directly onto the barrier, or alternatively onto a thin carrier plate which in turn is bonded or mounted onto the barrier. In naval applications the barrier may, for example, be made from high tensile naval steel. Although direct mounting of the transducer element on the substrate is possible, for wide frequency bandwidth data transducers there are significant benefits gained by mounting the transducer on an intermediate plate, and in specific cases a plate of wedge section. The mean thickness directly below the active Piezo-electric transducer element of such plates is typically 3 mm or so. Where, as is usual, a non-compliant bonding/coupling layer is used, it is understood that this plate should be made as thin as possible to minimise the shear forces on the bond to the barrier in response to contraction due to the mechanical stiffness of the plate.

In NPDT, good data or power transfer may be achieved using good acoustic coupling between the transducer, the substrate and the other transducer. High frequency acoustic transducers can be acoustically matched to the substrate in order to efficiently couple the acoustic energy in and out of the substrate by reducing acoustic reflections at the interface between each transducer and the substrate.

Acoustic matching is determined in part by the ratio of the acoustic impedances of the respective materials that are bonded together. The acoustic impedance $Z_a$ of a material is equal to the product of its density $\rho$ and acoustic velocity $v_a$. The acoustic reflectivity $R_{interface}$ of an interface between two materials of acoustic impedance $Z_1$ and $Z_2$ is given by the formula:

$$R_{interface} = \frac{(Z_2 - Z_1)^2}{(Z_2 + Z_1)^2} \quad (1)$$

The acoustic reflectivity of a hypothetical interface between a 36° Y cut lithium niobate transducer of acoustic impedance 34.3 MRayls (1 MRayls=$1 \times 10^6$ kg m$^{-2}$ s$^{-1}$) and a naval steel substrate of acoustic impedance 46.3 MRayls would be ~2.2%, which is very low, and therefore these materials would be considered acoustically well matched.

Meanwhile the acoustic reflectivity $R_{bond}$ of a pair of interfaces formed by an acoustic bonding layer between two materials is given by the formula:

$$R_{bond} = \frac{(Z_{bond} - Z_1)^2}{(Z_{bond} + Z_1)^2} \quad (2)$$

Where the acoustic impedance $Z_{bond}$ arising from the finite thickness L of the bond layer, valid for low levels of acoustic attenuation within the bond layer, is given by:

$$Z_{bond} = Z_2 \left\{ \frac{Z_3 \cos(k_2 L) - iZ_1 \sin(k_2 L)}{Z_2 \cos(k_2 L) + iZ_3 \sin(k_2 L)} \right\} \quad (3)$$

Here $Z_1$ and $Z_3$ are the acoustic impedances for layers 1 and 3 on both sides of the bond line and $Z_2$ is the acoustic impedance of the bond layer of thickness L, while $k_2$ is the acoustic k vector given by $2\pi/\Lambda$ for sound of wavelength $\Lambda$ in side the bond material.

For the specific case of a 36° Y cut lithium niobate transducer bonded to a steel substrate it is found that the frequency bandwidth response of the transducer becomes severely compromised once the reflectivity of the transducer-substrate bond interface exceeds ~25% to ~30%.

Adhesive bonding is commonly used for materials such as steel or glass. However, the adhesive materials are generally poorly matched to the transducer or substrate material, for example the adhesive EP30 supplied by MasterBond has an acoustic impedance of only 1.97 MRayls which is a factor of 23 smaller than that of Naval Steel. This can result in a very narrow fractional bandwidth $\Delta f/f_c$ performance, where $\Delta f$ is the frequency bandwidth for efficient acoustic transduction, and $f_c$, is the centre frequency of operation for the transducer. This is normally overcome by using a very thin bond of under $1/100^{th}$ of a wavelength in thickness so, for example, for a 40 MHz centre frequency transducer this would be about 0.5 μm. If this thickness criterion is met, then fractional bandwidths of greater than ~30% to ~50% become possible depending on the specific transducer and substrate design combination. But in applications where very high compression strains are seen by the transducer such as on parts attached to a submerged submarine hull, when it deep dives, or in high pressure oil pipes, the compressive strain (or tensile strain in high pressure oil pipes) can lead to delamination or damage or bond failure to the transducer thereby impairing, or preventing data transfer.

Presently accepted design considerations therefore suggest that the thickness of any carrier plate should be as thin as possible to reduce shear stress on any adhesive bond layer to the barrier, and likewise any such adhesive layer should be as thin as possible so that reflections of acoustic power at the interface to the barrier are minimised. Our studies have however shown that the problems of delamination can be significantly reduced by attaching, e.g. by welding, a relatively thick element between the transducer and the barrier. This reduces the strain at the critical bond interface of the transducer to this thick element, or in the case of a transducer mounted on a carrier plate the critical bond interfaces between the transducer and the carrier and the carrier and the thick element.

SUMMARY OF THE INVENTION

Accordingly, we have designed a mounting arrangement for securing an element to a substrate which reduces the strain at a fixing interface between the element and the substrate so as to address at least some of the issues referred to above.

Accordingly, in one aspect there is provided a mounting arrangement for mounting an acoustic transducer on a surface of a solid rigid substrate which in use is subjected to strains in excess of $0.5\times10^{-3}$, the arrangement comprising a strain isolating element having a first surface attached to said substrate and a second surface attached to an attachment interface of said active element whereby, when said substrate is subjected to high compressive strain in use, the strain at said second surface is lower than that at said first surface, wherein said strain isolating element comprises a relatively narrow stem portion for attachment at said first surface to the solid rigid substrate and having an enlarged head portion attached at said second surface to said transducer.

The acoustic transducer is generally attached to the substrate for at least one of power and/or data transfer, monitoring, control, modulation etc purposes.

The term 'transducer component' is used herein to refer to the functioning transducer component that has been attached to the hull or barrier e.g. by adhesive. This may include just a transducer element bonded to a ground plane, with the ground plane constituting the attachment interface by which the transducer component to the barrier or hull, as set out in EP2122868 e.g. by an adhesive bond. Alternatively it may also include a carrier plate or intermediate element on which the transducer is mounted prior to attachment of the transducer component thereby formed to the barrier or hull as described above. In the first instance the 'attachment interface' of the acoustic transducer component as referred to herein, is the surface of the ground plane remote from the transducer element. In the second instance, the transducer component attachment interface is the surface of the carrier plate or intermediate element that is remote from the transducer element.

In particular, when said substrate is subjected to the compression strain of $1\times10^{-3}$, said strain isolating element may reduce said strain by a factor of at least 3; or by a factor of at least 20, and or by a factor of at least 40.

Said strain isolating element may be acoustically matched to the substrate such that reflections at the interface between the substrate and the strain isolating element as defined by equation 1 above are less than 50% for a data transmission requirement when a wedged carrier transducer mounting geometry is used, and less than ~10% for a power transmission requirement.

Conveniently one or more flexural mountings may be disposed between the periphery of the enlarged head and said substrate to reduce flexing movement of the periphery of said head in the directions toward and/or away from said substrate.

Said strain isolating element may be attached to said rigid solid substrate any suitable means capable of withstanding high levels of strain cycling, for example by one of welding, friction stir welding, brazing, soldering, and diffusion bonding, and which is substantially free of voids or defects, and preferably with at least 90% of the bond area being free of defects or voids.

Conveniently, said strain isolating element may be formed of a single material, such as a metal which may be for example the same material as the substrate; in another application it may be formed of two elements of different material.

In some embodiments, said strain isolating element is between 10 mm and 20 mm thick for an element of diameter ~50 mm.

In another aspect, this invention provides a method of mounting an active element on a solid rigid substrate, subject in use to compressive strains in excess of $0.5\times10^{-3}$, which method comprises the step of interposing between an attachment interface of said active element and said solid rigid substrate a strain isolating element, the strain isolating element being bonded to said rigid substrate over substantially the entire contact area, thereby to cause the strain at an attachment interface with the acoustic transducer to be less than that experienced by the solid rigid substrate when subjected to compressive strain.

BRIEF DESCRIPTION OF THE DRAWINGS

Whilst the invention has been described above, it extends to any inventive combination or sub-combination of novel features disclosed herein or in the following description or drawings.

Various embodiments of the invention will now be described by way of example only, reference being made to the accompanying drawings, in which.

DETAILED DESCRIPTION OF THE DRAWINGS

Figure 1:
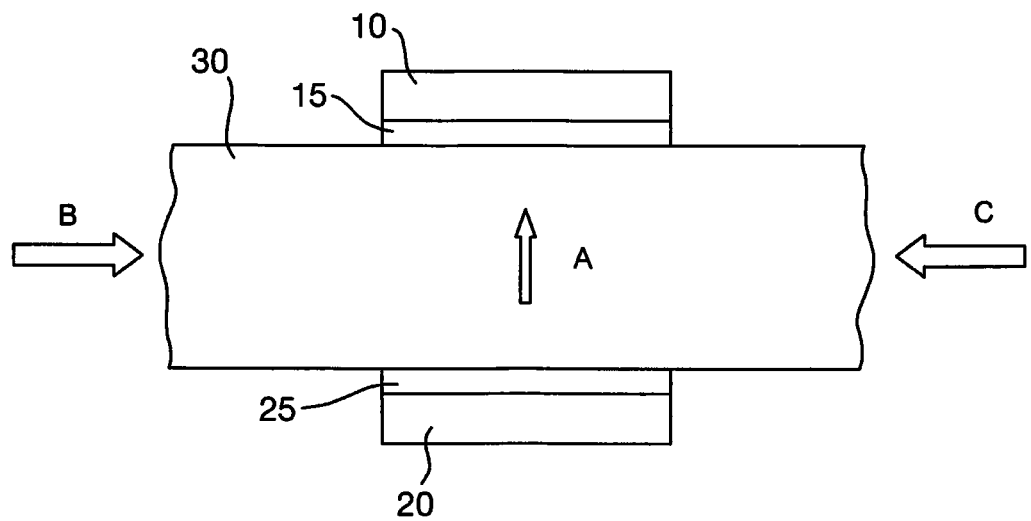
FIG. 1 shows a previously proposed arrangement of transducers for transmitting acoustic energy through an intervening barrier.

Referring to FIG. 1, it is known to mount a pair of transducers 10 and 20 on opposite sides of a barrier by means of epoxy adhesive bonding layers 15 and 25 respectively. This arrangement provides an acoustic path from one transducer to the other through bonding material 15, 25 and the barrier such that acoustic energy can propagate along path A as shown. In many applications, strain induced in the barrier in directions band c as explained above can cause substantial shear stresses at the bonding layers 15, 25. This can lead to delamination at the surface of the barrier 30. As discussed above the layers 15, 25 need to be as thin as possible to ensure good acoustic transmission.

Figure 2:
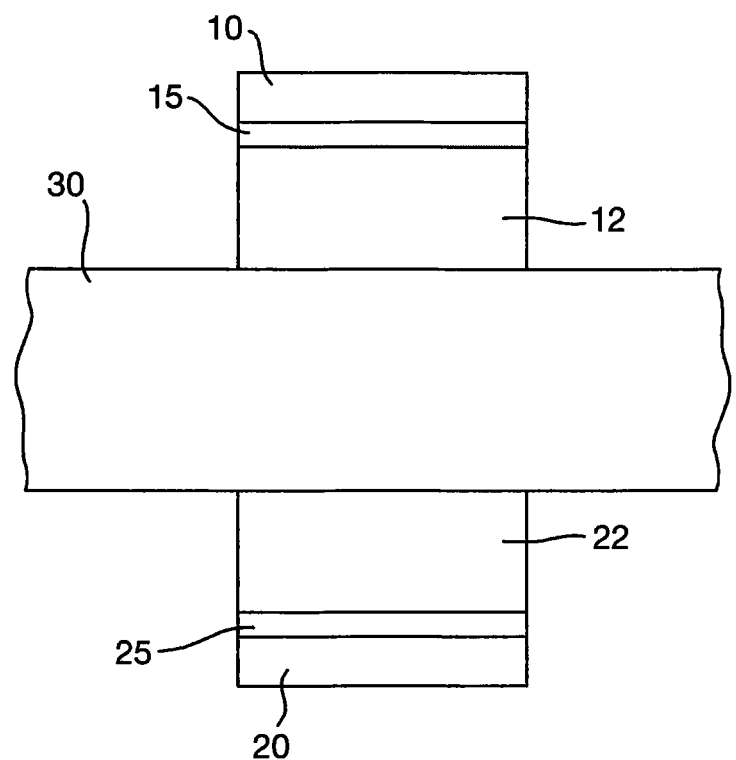
FIG. 2 is a schematic view showing a transducer mounting arrangement.

FIG. 2 shows an embodiment for mounting the transducers 10 and 20 to either side of the barrier in good acoustic contact but mounted so as to reduce the strain seen at the transducer bond and thereby reduce or avoid the possibility of delamination. In this embodiment, each transducer is mounted on a strain isolating element 12, 22 by means of, for example, a thin adhesive bond layer 15, 25 respectively of around 0.5 µm thickness for a transducer with a centre frequency of operation of ~40 MHz. The strain isolating elements 12 and 22 are formed from disks of material of substantially the same acoustic impedance as the material of the barrier, so as to provide good acoustic coupling. In this embodiment, the disks 12 and 22 are attached to the barrier material 30 by an intimate homogeneous surface-to-surface bond extending across substantially the whole of the interface without significant defects or voids. In this embodiment this is done by welding the disks to the barrier, although any other suitable attachment method may be used which is capable of securely attaching the strain isolating element to the barrier, whilst withstanding the operating strains and allowing good acoustic transfer. In certain applications, the barrier material may for example be a high tensile naval steel and the same or similar material could be used to form the disks 12 and 22. Other forms of attachment to provide the required intimate bond include friction stir welding, brazing, diffusion bonding or soldering.

In a particular example, the strain isolating elements 12 and 22 are about 10 mm thick and 50 mm in diameter. The transducer is then attached to the surface of the strain isolator remote from the barrier. In another example, the strain isolating elements are 20 mm thick and 50 mm in diameter.

We have conducted a strain analysis on two examples, namely a disk of 50 mm diameter and 10 mm thick and a disk of the same diameter but twice the thickness (20 mm) attached to the barrier by welding. An isotropic compression strain of $1 \times 10^{-3}$ in the barrier produces a mechanical strain on the mounting surface of the strain isolating element remote from the barrier resulting at the centre of the exposed surface of the discs in a strain of $3 \times 10^{-4}$ for the 10 mm disk and $4.6 \times 10^{-5}$ for the 20 mm disk. These strain values are to first order independent of the thickness of the barrier 30. This indicates that the 10 mm and 20 mm thickness disks reduce the strain by factors of about 3 and 21 respectively.

Figure 3:
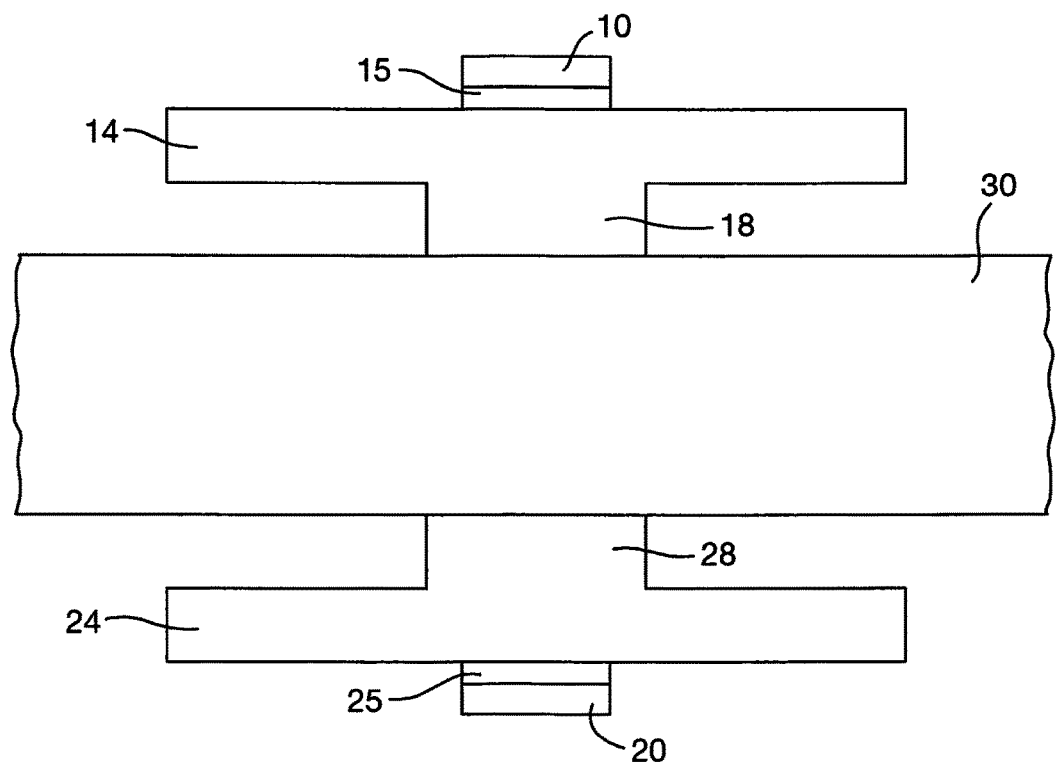
FIG. 3 is a view of an embodiment of transducer mounting arrangement in accordance with this invention, and FIGS. 4(a) and (b) are side section and plan views respectively of a second embodiment of transducer mounting arrangement in accordance with this invention.

In FIG. 3, the transducers 10 and 20 are mounted on mushroom-shaped strain isolator elements made up of a cylindrical stalk 18, 28 secured to the barrier 30 and topped by disks 14, 24 respectively. As in the above embodiment, the stalks are secured to the barrier material using an intimate homogenous bond extending across substrates the whole of the interface without significant voids or defects. Two samples were analysed, the first example having a 10 mm diameter stalk of thickness 5 mm topped by a 50 mm diameter disk of thickness 5 mm and the second example being made up of a 10 mm diameter stalk of thickness 10 mm topped by a 50 mm diameter disk of thickness 10 mm. The strain relief properties were analysed on the basis of application of an isotropic strain of $1 \times 10^{-3}$ to the barrier and the resultant strain reduction and ratios are given in the table below. Again these strain values are independent to first order of the thickness of the barrier. The strain values given in the table correspond to those directly above the 'stalk' of the structure.

| | Stalk | | Head | | | |
| --- | --- | --- | --- | --- | --- | --- |
| Sample | Diameter | Thickness | Diameter | Thickness | Strain | Improvement Ratio |
| A | 10 mm | 5 mm | 50 mm | 5 mm | $2.1 \times 10^{-5}$ | ~47 |
| B | 10 mm | 10 mm | 50 mm | 10 mm | $6.7 \times 10^{-7}$ | ~1500 |

As seen, strain reductions improvements of ratios ~47 and ~1500 respectively are possible with the geometry shown in FIG. 3 and the dimensions mentioned above. The reduction in strain with the geometry shown in FIG. 3 occurs because the periphery of the disks 14 and 24 tend to resist transmission of compressive strain on their surfaces remote from the barrier due to tension forces induced on the centre of the disk by the outer parts of the disk.

Figure 4A:
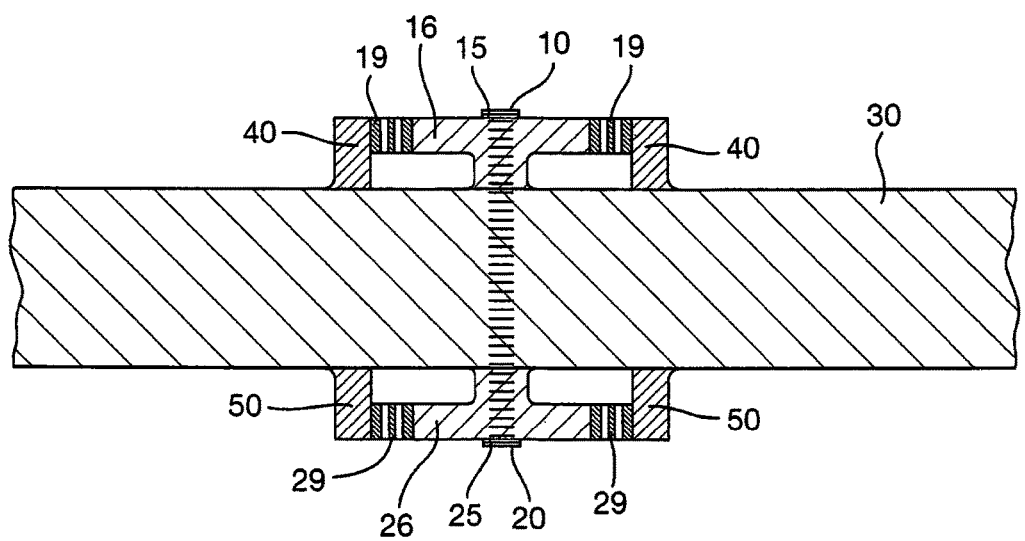

The arrangement shown in FIG. 3 may be unstable in certain applications when subjected to high levels of shock. For such applications, a modified arrangement may be used as shown in FIGS. 4(a) and (b). The arrangement of FIG. 4 includes an arrangement of kinematic hinges to improve the structural support of the otherwise unsupported disk edges but also decouples the disk from compressive strain at the supporting points. In this arrangement, the strain isolator 16 and 26 are of generally 'mushroom' form as before, but include a number of spaced kinematic hinges 19 and 29 around the periphery of the disk that bridge the gap between the disc and the surrounding annular ring 40 that is welded to the barrier. The annular ring 40 could be attached to the barrier by any suitable bonding technique such as welding. Other ways of achieving similar effect may be used, for example an appropriate array of thin rods.

Although in the embodiments the same type of mounting is used on both sides of the barrier, it will be appreciated that the mountings may be suitably modified according to the conditions prevalent on each side. In this specification, the term 'transducer' is intended to encompass transducers mounted to carrier plates as well as transducers attached directly to the surfaces described. The dimensions given are by way of example only and, relate to the typical transducer size used in many applications (about 7 mm×7 mm). It will of course be appreciated that the dimensions, shape and mounting of the strain isolating elements may be modified as required for a particular application.

Figure 4B:
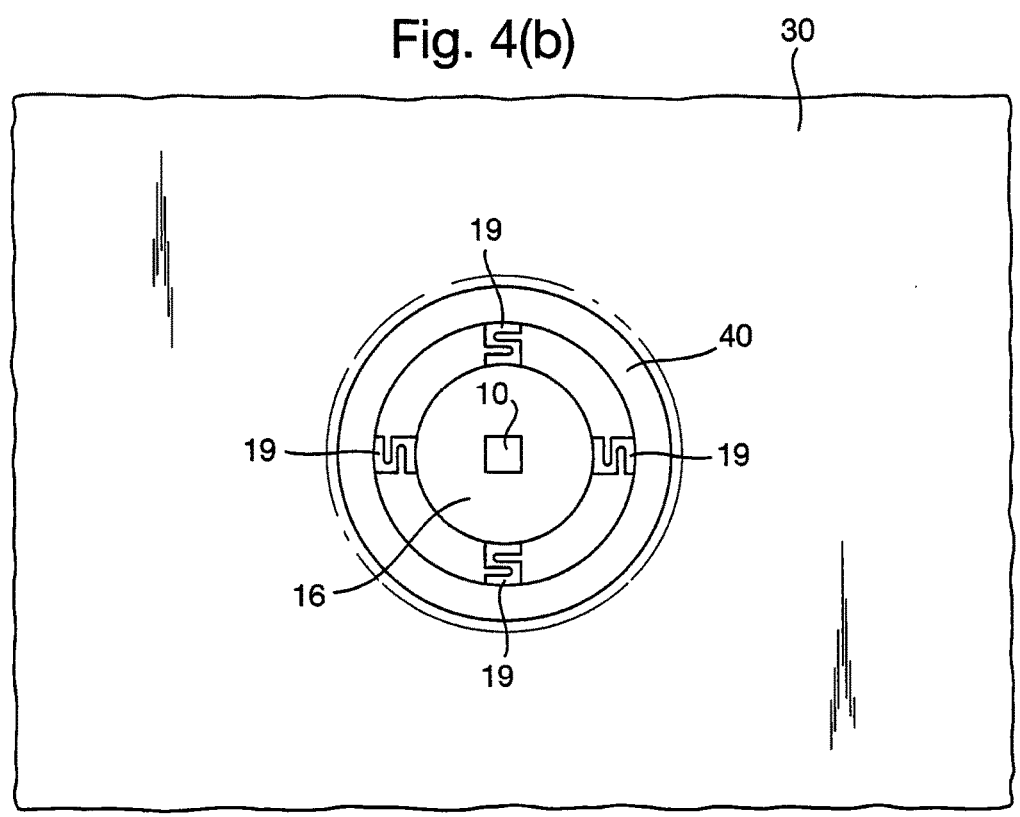

In the 'mushroom' type arrangements of FIGS. 3 and 4, the stalk could be formed of a different material, for example of weaker material, that is a material with a substantially smaller Young's Modulus for example, the central stalk could be made of copper which is acoustically nearly a perfect match to steel and has a Young's Modulus that is about half that of high tensile naval steel. The copper could then be attached to a steel disk by diffusion bonding.

As an alternative to the 'mushroom' type arrangements of FIGS. 3 and 4, other forms of tapering or stepped isolation element are contemplated by the present invention. For example, the strain isolating element may have the form of a frustrum or a cupola, provided that one end has a lesser width (to form the stem) than the other (to form the head).

In particular the element may have the form of a conical frustrum where the circular surface at the smaller diameter end (i.e. the stem) of the element is for bonding to the substrate and the larger surface at the opposite end (i.e. the head) is for bonding to the attachment interface.

Where the 'mushroom' type arrangement comprises a stepped form, the internal corners may be chamfered or filleted.

In addition, while preferred embodiments of the present invention have been described using specific terms, such description is for illustrative purposes only, and it is to be understood that changes and variations may be made without departing from the spirit or scope of the following claims.

The invention claimed is:

1. A non-penetrating data transfer mounting arrangement attached to a surface of a solid rigid substrate which in use is subjected to strains in excess of $0.5 \times 10^{-3}$, which arrangement comprises:
a first acoustic transducer having an attachment surface, and a first strain isolating element having a relatively narrow first stem portion having a first surface attached to a first surface of said substrate and an enlarged first head portion having a second surface attached to the attachment surface of said first acoustic transducer, the first transducer and the first stem portion being coaxially aligned, the first stem portion and the first head portion being a solid unitary region of material extending without a gap through the coaxial alignment between the attachment surface of the first acoustic transducer and the first surface of the substrate, the first strain isolating element being configured such that when said substrate is subjected to a compressive strain in use, the strain at said second surface of said first strain isolating element is lower than that at said first surface of said first strain isolating element; and
a second acoustic transducer having an attachment surface, and a second strain isolating element having a relatively narrow second stem portion having a first surface attached to a second surface of said substrate and an enlarged second head portion having a second surface attached to the attachment surface of said second acoustic transducer, the second transducer and the second stem portion being co-axially aligned, the second stem portion and the second head portion being a solid unitary region of material extending without a gap through the coaxial alignment between the attachment surface of the second acoustic transducer and the second surface of the substrate, the second strain isolating element being configured such that when said substrate is subjected to a compressive strain in use, the strain at said second surface of said second strain isolating element is lower than that at said first surface of said second strain isolating element,
wherein said first strain isolating element and said second strain isolating element being coaxially aligned with respect to each other about the first and second stem portions, and the first and second stem portions being coaxially aligned with respect to each other about the substrate, such that a non-penetrating data transfer is passed from the first transducer to the second transducer through the coaxially aligned first and second strain isolating elements and said substrate when said substrate is subjected to strains in excess of $0.5 \times 10^{-3}$.

2. A non-penetrating data transfer mounting arrangement according to claim 1, wherein said first surface of each said first and second strain isolating elements is configured to be in contact with said substrate over substantially the whole of each said first surface.

3. A non-penetrating data transfer mounting arrangement according to claim 1, wherein each of said first and second strain isolating elements reduces said strain by a factor of at least 3.

4. A non-penetrating data transfer mounting arrangement according to claim 1, wherein each of said first and second strain isolating elements reduces said strain by a factor of at least 20.

5. A non-penetrating data transfer mounting arrangement according to claim 1, wherein each of said first and second strain isolating elements reduces said strain by a factor of at least 40.

6. A non-penetrating data transfer mounting arrangement according to claim 1 including a flexural mounting disposed between the periphery of the enlarged head of each said first and second strain isolating elements and said substrate to reduce flexing movement of the periphery of each said head.

7. A non-penetrating data transfer mounting arrangement according to claim 6, wherein the flexural mounting comprises a plurality of hinges.

8. A non-penetrating data transfer mounting arrangement according to claim 7, wherein each of the first and second strain isolating elements further comprises an annular ring attached to the periphery of each respective enlarged head and configured to attach to the substrate, the plurality of hinges being disposed between the periphery of each respective enlarged head and the annular ring.

9. A non-penetrating data transfer mounting arrangement according to claim 1, wherein each of said first and second strain isolating elements is attached to said rigid solid substrate by one of welding, brazing, soldering, diffusion bonding and friction stir welding.

10. A non-penetrating data transfer mounting arrangement according to claim 1, wherein each of said first and second strain isolating elements is formed of a single material.

11. A non-penetrating data transfer mounting arrangement according to claim 1, wherein each of said first and second strain isolating element is formed of two elements of different material.

12. A non-penetrating data transfer mounting arrangement according to claim 1, wherein the thickness of each of said first and second strain isolating elements in a direction normal to the interface is between 5 mm and 30 mm.

13. A non-penetrating data transfer mounting arrangement according to claim 1, wherein said thickness is between 10 mm and 20 mm.

* * * * *